United States Patent [19]

Abu-Amara et al.

[11] Patent Number: 5,864,541
[45] Date of Patent: Jan. 26, 1999

[54] METHOD AND SYSTEM FOR SIMULTANEOUS SERVICE CAPACITY CALCULATION FOR MULTIMEDIA SERVICES UNDER AGGREGATE TRAFFIC CONDITIONS

[75] Inventors: Hosame Hassan Abu-Amara, Richardson; Venkat Kotamarti, Dallas, both of Tex.

[73] Assignee: Northern Telecom Limited, Montreal, Canada

[21] Appl. No.: 775,162

[22] Filed: Dec. 31, 1996

[51] Int. Cl.$^6$ ...................................................... H04L 12/56
[52] U.S. Cl. .......................... 370/253; 370/437; 370/468
[58] Field of Search .................................. 370/229, 230, 370/253, 465, 468, 235, 433, 437; 455/453, 454, 528, 426, 67.1

[56] References Cited

U.S. PATENT DOCUMENTS

| | | | |
|---|---|---|---|
| 5,428,819 | 6/1995 | Wang et al. | 455/454 |
| 5,583,857 | 12/1996 | Soumiya et al. | 370/253 |
| 5,751,712 | 5/1998 | Farwell et al. | 370/465 |

Primary Examiner—Chi H. Pham
Assistant Examiner—Maikhanh Tran
Attorney, Agent, or Firm—John D. Crane; Andrew J. Dillon

[57] ABSTRACT

A method and system are provided for calculating the simultaneous service capacity for multimedia traffic under aggregate traffic conditions within a shared transmission medium, such as an ATM network. A total number of different traffic services as well as a specification of the peak rate, average idle sojourn time and an average burst sojourn time are determined, either based upon available standards or calculated based upon models of the traffic services. The total available system bandwidth is specified by a network operator/designer. The number and size of queues utilized for receiving packetized telecommunication traffic within the network are also specified. The length and time of a busy period specified by the network operator/designer, a maximum acceptable packet loss rate and the probability that a user will access the network during the busy period are also specified. Finally, the percentage of all subscribers who subscribe to each service and the average session duration for each service are also specified. Thereafter, utilizing these parameters, the simultaneous capacity for the network can be accurately determined, whether a single central queue or multiple distributed queues are utilized.

14 Claims, 3 Drawing Sheets

METHOD AND SYSTEM FOR SIMULTANEOUS SERVICE CAPACITY CALCULATION FOR MULTIMEDIA SERVICES UNDER AGGREGATE TRAFFIC CONDITIONS

CROSS-REFERENCE TO RELATED APPLICATION

This application is related to co-pending United States patent application Ser. No. 08/775,158, filed of even date herewith by the inventors herein named. The aforementioned co-pending application is hereby incorporated herein by reference thereto.

BACKGROUND OF THE INVENTION

1. Technical Field

The present invention relates to improvements in network design and in particular to improved methods and systems for simultaneous capacity calculation in a shared transmission medium network. Still more particularly, the present invention relates to a method and system for simultaneous capacity calculation for multimedia services under aggregate traffic conditions which can be utilized in systems having both central queues and distributed queues.

2. Description of the Related Art

No where has the explosion of modern technology been more evident than in the field of communication. The number and type of communication services has been rapidly expanding, including so-called "multimedia" services such as video teleconferencing, video/movies on demand and the like.

The intermixing of these multimedia services with traditional data and voice communications within a shared transmission medium has presented various design problems. For example, consider a system which receives packetized telecommunication traffic from n multimedia services which are queued either in one central queue or in multiple distributed queues wherein one queue is associated with each service. Thus, if more than n subscribers to the services are utilizing the network at any given time, the received packets which are not processed by the system are queued. During heavy use periods, as the number of users increase, and these queues become quite large, certain packets may be discarded based upon a priority scheme, delay will increase, and quality of service will suffer.

Consequently, those skilled in the art will appreciate that one design requirement for a viable multimedia network requires that a limit exits for the number of users simultaneously connected to the network so that customer expectations, quality of service parameters, and network efficiency will not suffer.

One common technique utilized in the past to satisfy customer expectations is to ensure that the quality of service parameter values for the multimedia services are not exceeded. In view of the fact that a modern network may include multiple diverse multimedia services having variable quality of service values, it should be apparent that it would be advantageous to have a technique which could be utilized to calculate simultaneous capacity in an efficient and accurate manner.

In the past, attempts at statistically modeling aggregate traffic which originates from homogenous services with similar traffic types and similar characteristics have been proposed. For example, the Poisson Process is widely utilized to model aggregate traffic from voice sources. Similarly, the discreet Auto Regressive Process has been utilized to model aggregate traffic from video-teleconferencing sources. A Markov Modulated Poisson Process is often utilized to model aggregate traffic from data sources. These techniques typically require complex mathematical expressions which are not explicit and which require time-consuming numerical methods to solve.

Further, these expressions do not apply directly to the problem of networks having diverse multimedia services with different quality of service values. For example, utilizing the known expressions in the prior art with the most stringent quality of service values for the various services within the network will result in a gross under-estimate of the simultaneous capacity of the network and therefore a loss of potential revenue to system operators. Similarly, applying the expressions for the most lenient quality of service values results in a gross over-estimate of simultaneous capacity and therefore a violation of the quality of service values during heavy traffic load situations.

Thus, those skilled in the art will appreciate that a method and system for accurately and efficiently calculating simultaneous capacity of multimedia services under aggregate traffic conditions would greatly enhance the efficiency of network design and the level of customer satisfaction.

SUMMARY OF THE INVENTION

It is therefore one object of the present invention to provide an improved network design.

It is another object of the present invention to provide an improved method and system for simultaneous capacity calculation in a shared transmission medium network.

It is yet another object of the present invention to provide an improved method and system for simultaneous capacity calculation for multimedia services under aggregate traffic conditions which can be utilized in systems having both central queues and distributed queues.

The foregoing objects are achieved as is now described. A method and system are provided for calculating the service capacity for multimedia traffic under aggregate traffic conditions within a shared transmission medium, such as an ATM network. A total number of different traffic services as well as a specification of the peak rate, average idle sojourn time and an average burst sojourn time are determined, either based upon available standards or calculated based upon models of the traffic services. The total available system bandwidth is specified by a network operator/designer. The number and size of queues utilized for receiving packetized telecommunication traffic within the network are also specified. The length and time of a busy period specified by the network operator/designer, a maximum acceptable packet loss rate and the probability that a user will access the network during the busy period are also specified. Finally, the percentage of all subscribers who subscribe to each service and the average session duration for each service are also specified. Thereafter, utilizing these parameters, the simultaneous capacity for the network can be accurately determined, whether a single central queue or multiple distributed queues are utilized.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
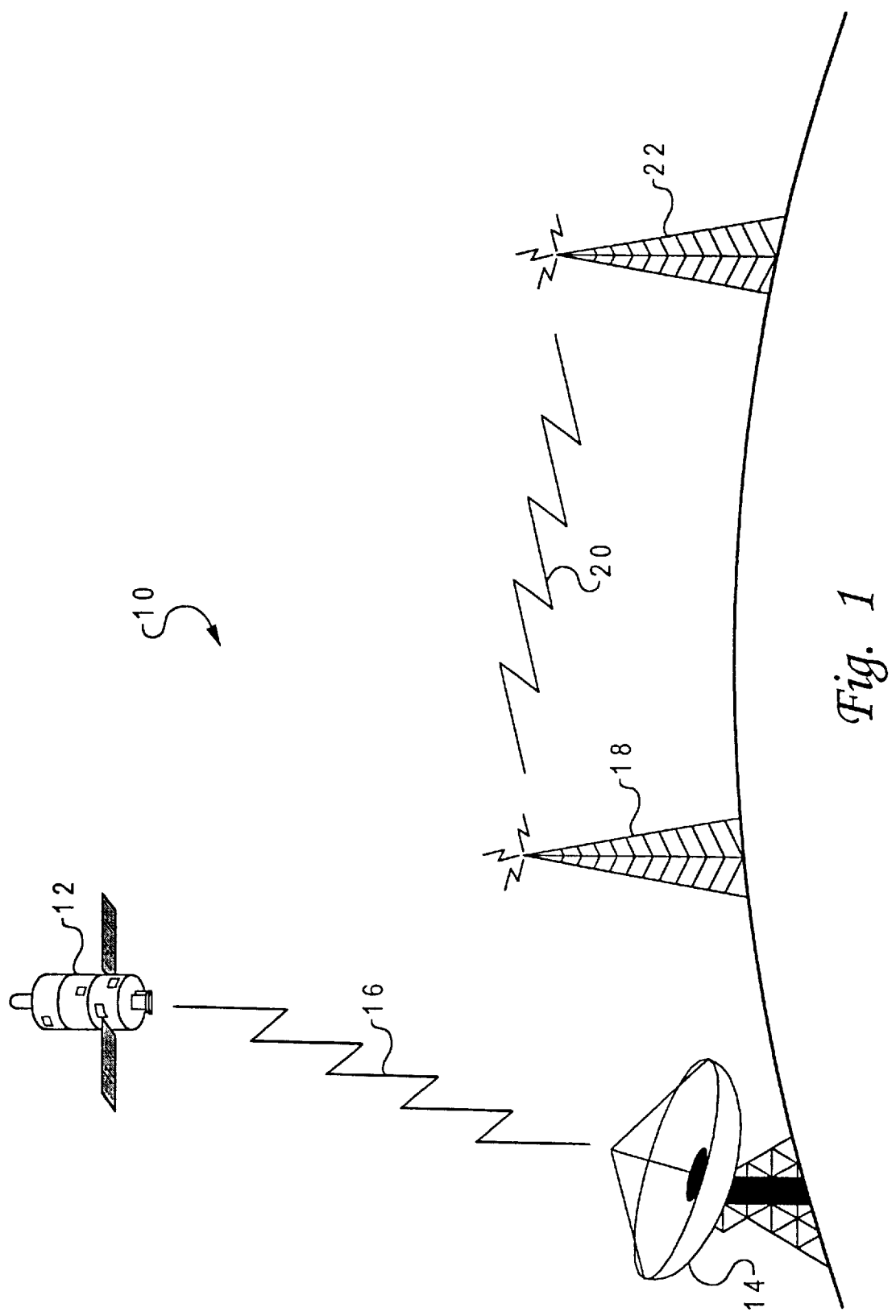
FIG. 1 is a schematic representation of a communication network which can incorporate multimedia traffic within an shared transmission medium.

With reference now to the figures and in particular with reference to FIG. 1, there is depicted a schematic representation of a communication network which incorporates multimedia traffic within a shared transmission medium. As illustrated, communication network 10 may include multiple transmission sources and receivers coupled together utilizing various transmission medium. For example, one type of network which may advantageously utilize the method and system of the present invention, is an ATM network which is utilized in conjunction with satellite communication. Thus, satellite 12 may communicate with earth station 14 over transmission medium 16. Similarly transmission tower 18 may communicate with transmission tower 22 over transmission medium 20. Of course, those skilled in the art will appreciate that transmission medium 16 will comprise a high frequency wide bandwidth radio frequency transmission medium; however, the method and system of the present invention will find application in any system in which aggregate multimedia traffic will occupy a shared transmission medium, such as, for example, a fiber optic transmission medium.

Figure 2:
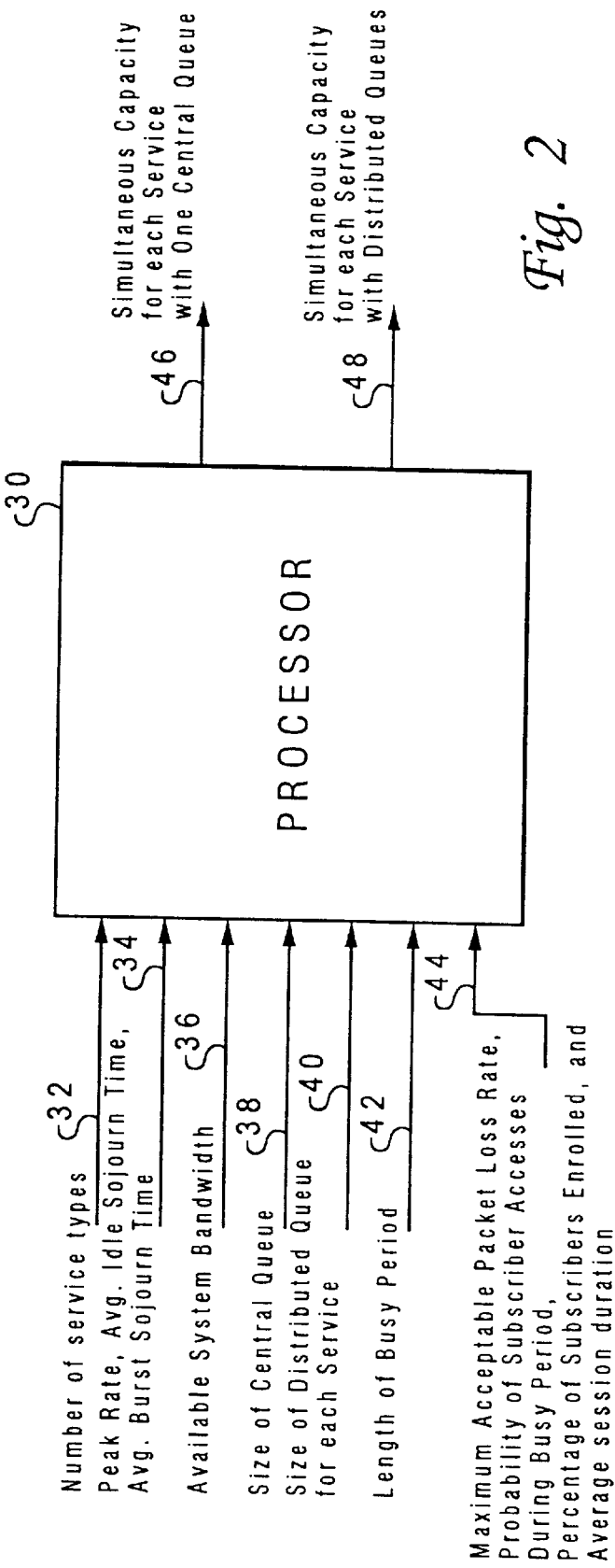
FIG. 2 is a high level block diagram of a system for calculating maximum simultaneous service capacity for multimedia traffic under aggregate traffic conditions within a shared transmission medium.

Referring now to FIG. 2 there is depicted a high level block diagram of a system for calculating simultaneous service capacity for multimedia traffic under aggregate traffic conditions within a shared transmission medium in accordance with the present invention. As illustrated, the system depicted in FIG. 2 utilizing, as its central element, processor 30. Processor 30 may comprise an appropriately programmed computer such as a personal computer, workstation or other suitable computer possessing sufficient processor assets and processing capability to create the model which will described herein.

Those skilled in the art will appreciate that in order to accurately calculate the maximum simultaneous service capacity for multimedia traffic under aggregate traffic conditions within a shared transmission medium, it is necessary to accurately describe the various types of aggregate traffic which originate from the heterogeneous sources which may include widely diverse quality of service characteristics. Thus, it is important to generate appropriate parameters for this assessment so that these parameters may be utilized as an input to a network design tool.

As depicted, processor 30 utilizes seven different inputs to generate two different outputs. Input 32, as depicted within FIG. 2, comprises the total number of different types of telecommunication traffic within the transmission medium. This number is typically provided by the network operator or the design engineer specifying a particular network. Each type of telecommunication traffic is referred to herein as a "service." These services may include voice, data, teleconferencing, video on demand and other similar communication types.

Next, as specified at input 34, the specification of the peak rate, average idle sojourn time and average burst sojourn time for each service within the network are input to processor 30. The peak rate for each service may be obtained from a standards body such as the International Telecommunication Union-Telecommunication (ITU-T) or obtained from measurements or research literature. The average idle sojourn time and average burst sojourn time may be similarly determined, or may be determined in the manner set forth in the co-pending application referenced above.

Next, as depicted at input 36 the total available system bandwidth in bits per second is specified. This number is typically provided by the network operator or network designer. Those having skill in the art will appreciate that the available bandwidth for a network will have a critical impact upon the quality of service within a network and thus, an impact upon the simultaneous capacity of that network.

Next, input 38 comprises an indication of whether or not all services within the network share a central queue and if so, a specification of the queue size in bits. Again, this input is specified by the network operator or the design engineer specifying the network.

Next, input 40 comprises an indication of whether or not each service within the network has a separate distributed queue associated therewith and a specification of the queue size in bits available for each service. Again, this information is provided by the network operator or design engineer.

Input 42 comprises the length of the busy period anticipated for utilization by subscribers of the proposed network. This number is typically provided by the network operator or network designer.

Finally, input 44 comprises a maximum acceptable packet loss rate, the probability that a user who accesses the service will do so during the busy period set forth above, the percentage of all subscribers who subscribe to each particular service and the average session duration for each particular service. These values can be obtained from measurements, research literature or standards bodies such as the ITU-T.

These inputs, when combined in the manner which will be described in detail below, can be utilized to produce outputs 46 and 48 which provided an accurate calculation of the simultaneous service capacity for multimedia services under aggregate traffic conditions in accordance with the method and system of the present invention.

Thus, output 46 specifies the simultaneous capacity for each service in a network which utilizes one central queue for packets which await processing. Similarly, output 48 comprises the simultaneous capacity for each service within the network wherein each service has a distributed queue available for packets utilizing that service.

Figure 3:
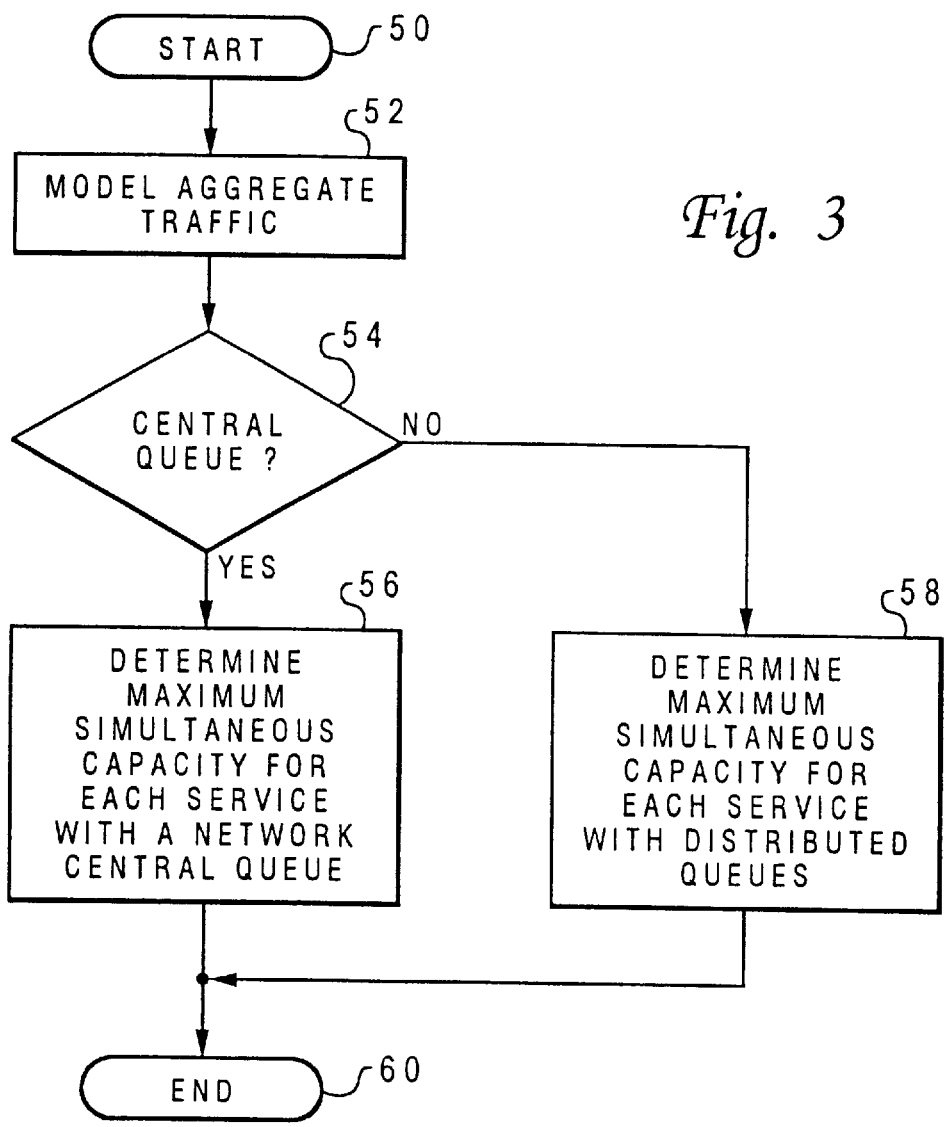
FIG. 3 is a high level logic flowchart of the method for calculating simultaneous service capacity for multimedia traffic under aggregate traffic conditions within a shared transmission medium in accordance with the present invention.

Finally, with reference to FIG. 3, there is depicted a high level logic flowchart of the method for simultaneous service capacity calculation for multimedia services under aggregate traffic conditions in accordance with the present invention. As illustrated, the process begins at block 50 and thereafter passes to block 52. Block 52 depicts the modeling of the aggregate traffic within the network from each traffic source as a stochastic system. This model then identifies the peak rate ($R_j$), average idle sojourn time ($1/\lambda_j$) and the average burst sojourn time ($1/\mu_i$) for each service i. As noted above, these values may be obtained from measurements, research literature or standard body such as the ITU-T. Additionally, the average idle sojourn time and average burst sojourn time may be calculated in the method set forth within the co-pending patent application referenced above. Next, the average utilization ($u_i$) is defined as follows:

$$u_i = \frac{\frac{1}{\mu_i}}{\frac{1}{\mu_i} + \frac{1}{\lambda_i}}$$

Next, the maximum allowed quality of service packet loss rate $E_i$, the probability $E_i$ that a user will utilize service i, the percentage $M_i$ of subscribers who actually use service i and the average session duration $S_i$ for service i are determined by reference to the literature, standards bodies or research materials. Thus, if the length of the busy period is T, then the normalized session duration $G_i$ may be expressed as follows: $G_i=\min\{1, T/S_i\}$ Next, the process passes to block 54. Block 54 illustrates a simple determination of whether or not the network under consideration utilizes a central queue for all services or a distributed system in which each service utilizes its own separate queue.

Next, referring to block 56, if all services within the network share the same central queue, the model created utilizing the process described above with respect to block 52 may then be utilized to determine the maximum simultaneous capacity for multimedia services under aggregate traffic conditions. Thus, if $N_i$ is the simultaneous capacity for each service i in the network, wherein x is the size in bits of the central queue and the system capacity is C, then the value of each $N_i$ may be computed as follows:

For each service $i$, define $\sigma_i = E_i^* M_i^* G_i$

Thereafter, for each service i, it is necessary to determine the largest positive integer N such that:

$$C = \min\left\{ N \sum_{i=1}^{K} \left\{ \frac{\sigma_i}{[2^*\ln(\epsilon_i)^*(1/\mu_i)^*(u_i-1)]} [\ln(\epsilon_i)^*(1/\mu_i)^*(u_i-1)^*R_i - x + \sqrt{[\ln(\epsilon_i)^*(1/\mu_i)^*(u_i-1)^*R_i - x]^2 + 4x^*\ln(\epsilon i)^*(1/\mu_i)^*(u_i-1)^*u_i^*R_i} \right\}, \sum_{i=1}^{K} \{N^*\sigma_i^*R_i^*u_i + R_i^* \sqrt{N^*\sigma_i^*(1-u_i)} * \sqrt{-2\ln(\epsilon_i) - \ln(2\pi)}\} \right\}$$

Thus, for each service i, $N_i$, the simultaneous capacity for that service, is equal to N * $\sigma_i$.

Referring again to block 54, in the event the network under consideration utilizes multiple distributed queues, the process passes from block 54 to block 58. As above, the model generated utilizing the steps described with respect to block 52 may be utilized to determine the maximum simultaneous capacity for each service in a network having distributed queues. As above, if $N_i$ is the simultaneous capacity for each service i, where $x_i$ is the size and bits of the queue for service i, and the capacity for service i is $C_i$, then the value of each $N_i$ is the largest positive integer $N_i$ such that $$C_i = \min\left\{ \left\{ \frac{N_i}{[2^*\ln(\epsilon_i)^*(1/\mu_i)^*(u_i-1)]} [\ln(\epsilon_i)^*(1/\mu_i)^*(u_i-1)^*R_i - x + \sqrt{[\ln(\epsilon_i)^*(1/\mu_i)^*(u_i-1)^*R_i - x]^2 + 4x^*\ln(\epsilon i)^*(1/\mu_i)^*(u_i-1)^*u_i^*R_i} \right\}, \{N_i^*R_i^* u_i + R_i^* \sqrt{N_i^*(1-u_i)} * \sqrt{-2\ln(\epsilon_i) - \ln(2\pi)}\} \right\}$$

Upon reference to the foregoing, those skilled in the art will appreciate that by utilizing the modeling techniques set forth herein, the maximum simultaneous capacity for multimedia traffic under aggregate traffic conditions within a shared transmission medium may be accurately and efficiently assessed despite the presence of diverse traffic types and quality of service characteristics. The method and system of the present invention utilize the characteristics of those services, the available network bandwidth, and the size and number of queues within the system in addition to a specified length of busy period and maximum acceptable packet loss rate to accurately and efficiently calculate the maximum simultaneous capacity of multimedia services under aggregate traffic conditions for networks which utilize both central queues and networks which utilize multiple distributed queues for each service. The method and system set forth herein provide a model which is simple enough to be evaluated very rapidly and in real-time and which is accurate enough to be comparable with time-consuming numerical methods set forth in the prior art.

While the invention has been particularly shown and described with reference to a preferred embodiment, it will be understood by those skilled in the art that various changes in form and detail may be made therein without departing from the spirit and scope of the invention.

What is claimed is:

1. A method for determining a maximum simultaneous service capacity for each of a plurality of heterogenous telecommunication services under aggregate traffic conditions within a network having a shared transmission medium, said method comprising the steps of:

modeling said aggregate traffic in order to determine a peak rate, an average idle sojourn time and an average burst sojourn time for each of said plurality of heterogenous telecommunication services;

specifying total available bandwidth within said shared transmission medium;

specifying a required quality of service for each of said plurality of heterogenous telecommunication services; and calculating a maximum simultaneous service capacity for each of said plurality of heterogenous telecommunication services based upon said total available bandwidth within said transmission medium, said determined peak rate, average idle sojourn times, average burst sojourn times and said specified required quality of service for each of said plurality of heterogenous telecommunication services.

2. The method for determining a maximum simultaneous service capacity for each of a plurality of heterogenous telecommunication services according to claim 1 further including the step of specifying a number and size of each received packet queue within said network.

3. The method for determining a maximum simultaneous service capacity for each of a plurality of heterogenous telecommunication services according to claim 2 wherein said step of calculating a maximum simultaneous service capacity for each of said plurality of heterogenous telecommunication services comprises the step of calculating said maximum simultaneous service capacity for each of said plurality of heterogenous telecommunication services based upon said total available bandwidth within said transmission medium, said determined peak rate, average idle sojourn times, average burst sojourn times, said specified required quality of services for each of said plurality of heterogenous telecommunication services and said number and size of each received packet queue within said network.

4. The method for determining a maximum simultaneous service capacity for each of a plurality of heterogenous telecommunication services according to claim 1 further including the step of specifying a specific busy period during which said maximum simultaneous service capacity is calculated.

5. The method for determining a maximum simultaneous service capacity for each of a plurality of heterogenous telecommunication services according to claim 4 further including the step of determining a probability that a user will access a particular one of said plurality of heterogenous telecommunication services during said specific busy period.

6. The method for determining a maximum simultaneous service capacity for each of a plurality of heterogenous telecommunication services according to claim 5 further including the step of determining a percentage of all users within said network who subscribe to each of said plurality of heterogenous telecommunication services.

7. The method for determining a maximum simultaneous service capacity for each of a plurality of heterogenous telecommunication services according to claim 6 further including the step of determining an average session duration for each of said plurality of heterogenous telecommunication services.

8. A system for determining a maximum simultaneous service capacity for each of a plurality of heterogenous telecommunication services under aggregate traffic conditions within a network having a shared transmission medium, said system comprising:

means for modeling said aggregate traffic in order to determine a peak rate, an average idle sojourn time and an average burst sojourn time for each of said plurality of heterogenous telecommunication services;

means for specifying total available bandwidth within said shared transmission medium;

means for specifying a required quality of service for each of said plurality of heterogenous telecommunication services; and means for calculating a maximum simultaneous service capacity for each of said plurality of heterogenous telecommunication services based upon said total available bandwidth within said transmission medium, said determined peak rate, average idle sojourn times, average burst sojourn times and said specified required quality of service for each of said plurality of heterogenous telecommunication services.

9. The system for determining a maximum simultaneous service capacity for each of a plurality of heterogenous telecommunication services according to claim 8 further including means for specifying a number and size of each received packet queue within said network.

10. The system for determining a maximum simultaneous service capacity for each of a plurality of heterogenous telecommunication services according to claim 9 wherein said means for calculating a maximum simultaneous service capacity for each of said plurality of heterogenous telecommunication services comprises means for calculating said maximum simultaneous service capacity for each of said plurality of heterogenous telecommunication services based upon said total available bandwidth within said transmission medium, said determined peak rate, average idle sojourn times, average burst sojourn times, said specified required quality of services for each of said plurality of heterogenous telecommunication services and said number and size of each received packet queue within said network.

11. The system for determining a maximum simultaneous service capacity for each of a plurality of heterogenous telecommunication services according to claim 8 further including means for specifying a specific busy period during which said maximum simultaneous service capacity is calculated.

12. The system for determining a maximum simultaneous service capacity for each of a plurality of heterogenous telecommunication services according to claim 11 further including means for determining a probability that a user will access a particular one of said plurality of heterogenous telecommunication services during said specific busy period.

13. The system for determining a maximum simultaneous service capacity for each of a plurality of heterogenous telecommunication services according to claim 12 further including means for determining a percentage of all users within said network who subscribe to each of said plurality of heterogenous telecommunication services.

14. The system for determining a maximum simultaneous service capacity for each of a plurality of heterogenous telecommunication services according to claim 13 further including means for determining an average session duration for each of said plurality of heterogenous telecommunication services.

* * * * *

UNITED STATES PATENT AND TRADEMARK OFFICE
CERTIFICATE OF CORRECTION

PATENT NO. : 5,864,541
DATED : Jan. 26, 1999
INVENTOR(S) : *Abu-Amara et al.*

It is certified that error appears in the above-identified patent and that said Letters Patent is hereby corrected as shown below:

In col. 4, line 67, please delete "$(R_j)$" and "$(1/\lambda_j)$" and insert in those places: --$(R_j)$-- and --$(1/\lambda_j)$--, respectively.

In col. 6, at the end of the third line of the equation, please add --$\}$--.

Signed and Sealed this

Tenth Day of August, 1999

Attest:

Q. TODD DICKINSON

*Attesting Officer*   Acting Commissioner of Patents and Trademarks